(12) United States Patent
Ante et al.

(10) Patent No.: US 8,635,900 B2
(45) Date of Patent: Jan. 28, 2014

(54) METHOD FOR EVALUATING THE STATE OF A SOOT SENSOR IN A MOTOR VEHICLE

(75) Inventors: Johannes Ante, Regensburg (DE);
Rudolf Bierl, Regensburg (DE);
Markus Herrmann, Regensburg (DE);
Andreas Ott, Steinsburg (DE); Torsten Reitmeier, Wackersdorf (DE); Willibald Reitmeier, Hohenschambach (DE);
Denny Schädlich, Neustadt (DE);
Manfred Weigl, Viehhausen (DE);
Andreas Wildgen, Nittendorf (DE)

(73) Assignee: Continental Automotive GmbH, Hannover (DE)

( * ) Notice: Subject to any disclaimer, the term of this patent is extended or adjusted under 35 U.S.C. 154(b) by 305 days.

(21) Appl. No.: 12/905,660

(22) Filed: Oct. 15, 2010

(65) Prior Publication Data
US 2011/0088450 A1 Apr. 21, 2011

(30) Foreign Application Priority Data
Oct. 16, 2009 (DE) .......................... 10 2009 049 669

(51) Int. Cl.
*G01M 15/10* (2006.01)
(52) U.S. Cl.
USPC .......................... 73/23.33; 73/25.01; 73/28.01
(58) Field of Classification Search
USPC ............. 73/28.01, 23.2, 23.31–23.33, 28.02, 73/31.01–31.03, 31.05, 31.06
See application file for complete search history.

(56) References Cited

U.S. PATENT DOCUMENTS

| | | | |
|---|---|---|---|
| 6,634,210 B1* | 10/2003 | Bosch et al. | 73/23.33 |
| 7,004,942 B2* | 2/2006 | Laird et al. | 606/50 |
| 7,299,711 B1* | 11/2007 | Linker et al. | 73/863.23 |
| 7,543,477 B2* | 6/2009 | Berger et al. | 73/23.33 |
| 7,770,432 B2* | 8/2010 | Roesch et al. | 73/23.33 |
| 8,033,159 B2* | 10/2011 | Fleischer et al. | 73/28.01 |
| 8,035,404 B2* | 10/2011 | Schnell et al. | 324/724 |
| 8,176,768 B2* | 5/2012 | Kondo et al. | 73/23.33 |
| 8,182,665 B2* | 5/2012 | Dorfmueller et al. | 204/426 |

(Continued)

FOREIGN PATENT DOCUMENTS

| | | |
|---|---|---|
| DE | 10 2004 028 997 | 1/2006 |
| DE | 10 2004 028 997 A1 | 1/2006 |

(Continued)

OTHER PUBLICATIONS

Machine translation of DE 102006046837, downloaded Nov. 5, 2012.*

*Primary Examiner* — Leonard Chang
*Assistant Examiner* — Natalie Huls
(74) *Attorney, Agent, or Firm* — Cozen O'Connor

(57) ABSTRACT

A method for performing on-board functional diagnostics on a soot sensor of a vehicle and/or for detecting further components in the soot in a motor vehicle having an internal combustion engine. The soot sensor is electrically connected to an evaluation circuit with is permanently installed in the motor vehicle. In order to specify a method for performing functional diagnostics on a soot sensor and/or for detecting further components in the soot, with which method it is possible to detect a faulty soot sensor and/or further components in the soot in a cost-effective way, the evaluation circuit measures the temperature coefficient of the soot sensor and detects the defectiveness of the soot sensor and/or the presence of further components in the soot on the basis of the temperature coefficient of the soot sensor.

10 Claims, 4 Drawing Sheets

(56) References Cited

U.S. PATENT DOCUMENTS

| | | |
|---|---|---|
| 2005/0142034 A1 | 6/2005 | Kim et al. |
| 2009/0051376 A1 | 2/2009 | Schnell et al. |
| 2009/0090622 A1* | 4/2009 | Ripley ................... 204/401 |
| 2009/0126458 A1 | 5/2009 | Fleischer et al. |
| 2011/0011154 A1* | 1/2011 | Ante et al. ............... 73/23.33 |
| 2011/0015824 A1* | 1/2011 | Ante et al. ................... 701/34 |
| 2011/0030451 A1* | 2/2011 | Roesch et al. ........... 73/28.02 |
| 2011/0109331 A1* | 5/2011 | Nelson et al. ............. 324/693 |
| 2011/0156727 A1* | 6/2011 | Achhammer et al. ..... 324/691 |
| 2011/0203348 A1* | 8/2011 | Hedayat et al. ......... 73/23.33 |
| 2011/0314899 A1* | 12/2011 | Di Miro et al. .......... 73/23.33 |
| 2012/0006094 A1* | 1/2012 | Yokoi et al. .............. 73/23.33 |
| 2012/0103058 A1* | 5/2012 | Maeda et al. ............ 73/23.33 |
| 2012/0255340 A1* | 10/2012 | Ante et al. ................ 73/23.31 |

FOREIGN PATENT DOCUMENTS

| | | | |
|---|---|---|---|
| DE | 102004036388 A1 | 3/2006 | |
| DE | 102005030134 A1 | 1/2007 | |
| DE | 102006046837 A1 * | 4/2008 | ............ G01N 15/02 |
| DE | 102006053100 A1 | 5/2008 | |
| EP | 1 624 166 | 2/2006 | |
| EP | 1 624 166 B1 | 7/2007 | |

* cited by examiner

METHOD FOR EVALUATING THE STATE OF A SOOT SENSOR IN A MOTOR VEHICLE

BACKGROUND OF THE INVENTION

1. Field of the Invention

The invention relates to a method for evaluating a state of a soot sensor in a motor vehicle having an internal combustion engine. The loading of an exhaust gas stream of the internal combustion engine with soot particles is detected with the soot sensor that is electrically connected to an evaluation circuit permanently installed in the motor vehicle in evaluation circuit detects and evaluates conductivity between at least two measuring electrodes of the soot sensor. The invention also relates to a soot sensor which is operated with this method.

2. Description of the Related Art

The enrichment of the atmosphere with pollutants from exhaust gases is currently being hotly debated. Associated with this is the fact that the availability of fossil fuels is limited. In reaction to this combustion processes in the internal combustion engines are thermodynamically optimized so that their efficiency is improved. In the field of motor vehicles, this has resulted in the increasing use of diesel engines. However, the disadvantage of this combustion technology over optimized spark ignition engines is a significantly increased emission of soot. Soot is extremely carcinogenic, particularly due to the precipitation of polycyclic aromatics, which have already been the subject of various regulations. For example, exhaust gas emission standards with maximum limits for soot emissions have been issued. It is therefore necessary to specify cost-effective sensors which reliably measure the soot content in the exhaust gas stream of motor vehicles.

The use of such soot sensors serves to measure the currently emitted soot so that the engine management system in an automobile in an ongoing driving situation is provided with information to be able to reduce the emission values by control adaptations. Furthermore, by using soot sensors it is possible to initiate active exhaust gas purification by exhaust gas soot filters or exhaust gas recirculation to the internal combustion engine. In the case of soot filtering, regenerative filters are used which filter out a significant part of the soot content from the exhaust gas. Soot sensors are needed to detect soot so that the function of the soot filters can be monitored and/or their regeneration cycles can be controlled.

For this purpose, the soot filter, which is also referred to as a diesel particle filter, has a soot sensor connected upstream, and/or a soot sensor connected downstream.

The sensor which is connected upstream of the diesel particle filter serves to increase the system reliability and to ensure operation of the diesel particle filter under optimum conditions. Since this depends to a high degree on the mass of soot which has accumulated in the diesel particle filter, precise measurement of the particle concentration upstream of the diesel particle filter system, in particular the determination of a high particle concentration upstream of the diesel particle filter, is highly significant.

A sensor which is connected downstream of the diesel particle filter provides the possibility of performing on-board diagnostics in the vehicle, and also serves to ensure correct operation of the exhaust gas post-treatment system.

In the prior art there have been various approaches to the detection of soot. One approach which has been pursued to a large extent in laboratories is to use the scattering of light by the soot particles. This procedure is suitable for complex measuring devices. If an attempt is made also to use this procedure as a mobile sensor system in exhaust gas, it is necessary to take account of the fact that approaches for implementing an optical sensor in a motor vehicle are associated with high costs. Furthermore, there are unsolved problems relating to contamination of the required optical windows by combustion exhaust gases.

At present, particle sensors for conductive particles are known in which two or more metallic electrodes, which have electrodes that engage one in the other in the manner of a comb, are provided. Soot particles which are deposited on these sensor structures short-circuit the electrodes and therefore change the impedance of the electrode structure. As the particle concentration on the surface of the sensor rises, it is possible in this way to measure a decreasing resistance or an increasing current when a constant voltage is applied between the electrodes. Such a soot sensor is disclosed, for example, in DE 10 2004 028 997 A1.

However, the measured values which are detected by the soot sensor can change over the service life of the soot sensor. This may take place through deposition of ash on the measuring electrode structure or through a changed temperature cross-sensitivity of the soot. Evaluation of the state of the soot sensor during its entire service life is therefore necessary since without this state evaluation increasingly falsified measured values would result.

EP 1 624 166 B1 discloses a method for assessing the state of a particle sensor in which the loading of an exhaust gas stream with soot particles is detected, in which method the conductivity between two electrodes of a particle sensor which is subjected to the exhaust gas stream is detected. The particle sensor is, for this purpose, temporarily heated and the soot particles which are deposited on the particle sensor are burnt. During the heating, the conductivity between the electrodes of the particle sensor is detected and used for the evaluation of the state of the particle sensor. However, this often leads to highly fluctuating measured values since the electrical conductivity of the soot sensor is a second degree tensor (dyade), that is to say a highly complex multi-dimensional value.

SUMMARY OF THE INVENTION

An object of the invention is a method for evaluating the state of the soot sensor with which highly precise measured values for the conductivity between at least two measuring electrodes of the soot sensor can be detected.

Since the soot sensor is heated with current pulses and the conductivity between the measuring electrodes is detected at times between the current pulses, the temperature of the soot sensor is virtually constant during the detection of the conductivity and the tensor (dyade) of the electrical conductivity of the soot sensor is reduced in complexity value with a relatively small dimensionality is obtained for the tensor. In the specific case of a homogenous (location-independent), isotropic (direction-independent) and linear (field-size-independent) medium the electrical conductivity is a scalar, i.e. a unidimensional value. Only in this simple case, does the conduction of current in the measured system occur in a proportional fashion and in the same direction as the electrical field which causes the conduction of current. Since the conductivity between the measuring electrodes is detected at times between the current pulses, there are no electrical fields which falsify the measured values and which arise from the heating current. The proposed method therefore supplies highly precise measured values for the conductivity between at least two measuring electrodes of the soot sensor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the text which follows, the present invention will be explained with reference to the accompanying drawings and on the basis of a preferred embodiment. This embodiment comprises a soot sensor for use in a motor vehicle. In the drawings.

DETAILED DESCRIPTION OF THE PRESENTLY PREFERRED EMBODIMENTS

Figure 1:
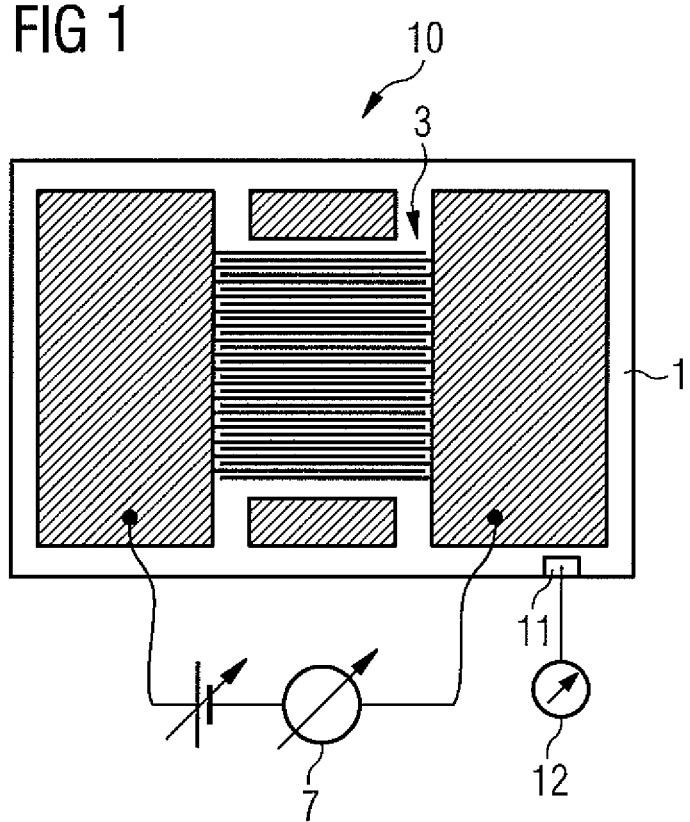
FIG. 1 is a soot sensor.

FIG. 1 shows a soot sensor 10, which is constructed from a shaped element 1, a heating element (not illustrated here) and a structure comprising measuring electrodes 3. The shaped element 1 can be manufactured from a ceramic material, or from some other material which has electrically insulating properties and which withstands the burn-off temperature of soot without difficulty. In order to burn off the soot from the soot sensor 10, the soot sensor 10 is typically heated to temperatures between 500 and 800° C. using an electrical resistance heater. The electrically insulating shaped element 1 must bear these temperatures without damage. The structure of the measuring electrodes 3 is embodied here, for example, as a comb-like structure, wherein an electrically insulating region of the shaped element 1 can always be seen between two measuring electrodes. The flow of current between the electrode structures is measured using a current-measuring element 7. As long as the soot sensor 10 is completely free of soot particles 4, no direct current can be measured by the current-measuring element 7 since a region of the shaped element 1 which has an electrically insulating effect and which is not bypassed by soot particles 4 is always present between the measuring electrodes 3. Furthermore, FIG. 1 shows a temperature sensor 11 as a component of the soot sensor 10 with temperature evaluation electronics 12 which serve to monitor the temperature prevailing in the soot sensor 10, in particular when the loading of soot on the soot sensor 10 is burnt off.

Figure 2:
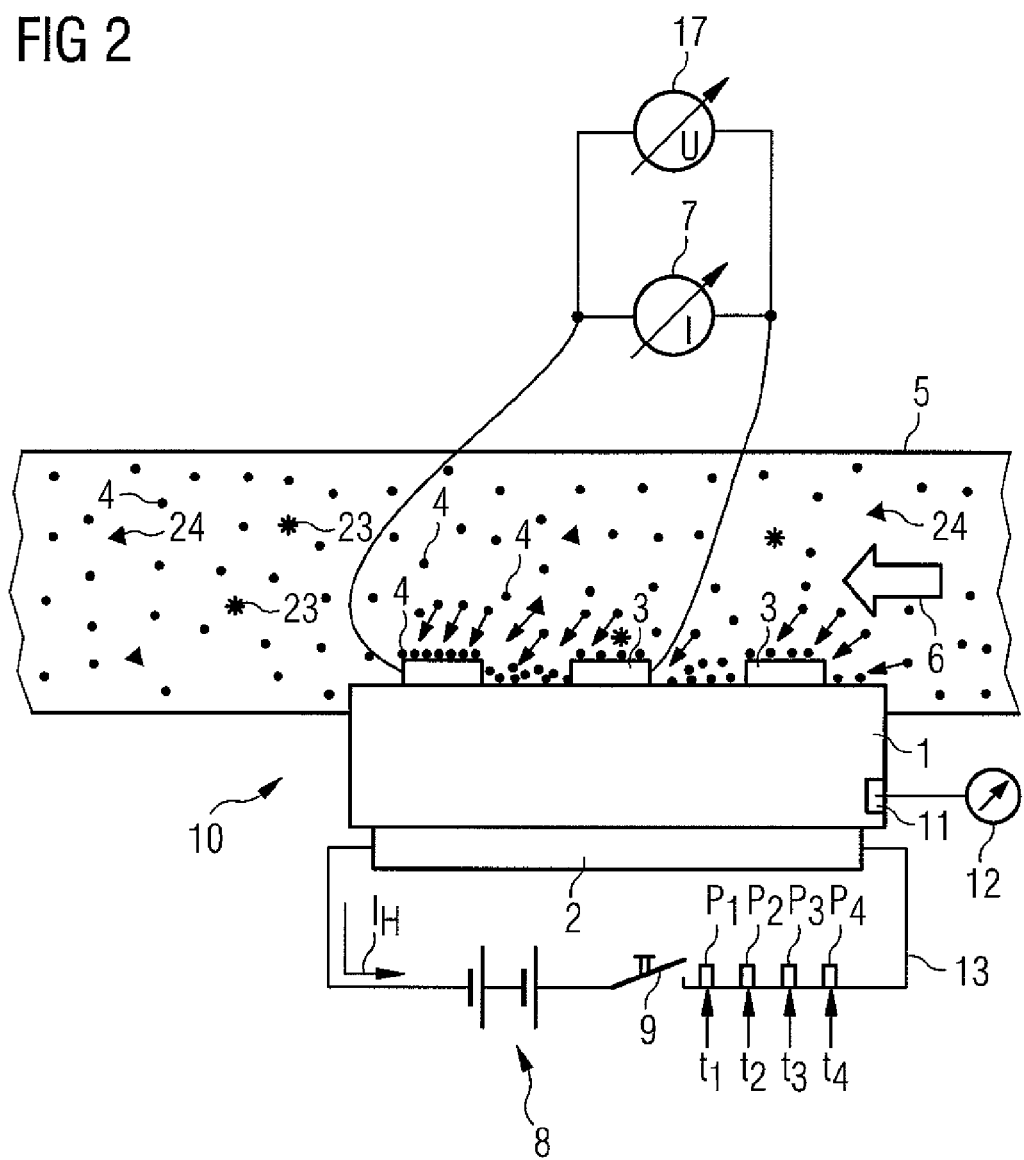
FIG. 2 Depicts operation of the soot sensor.

FIG. 2 shows the soot sensor 10 in operation. The soot sensor 10 is arranged here in an exhaust pipe 5 through which an exhaust gas stream 6 which is loaded with soot particles 4 is conducted. The exhaust gas stream 6 can have, in addition to the soot particles 4, further components such as, for example water 23, hydrocarbons 24, engine oil and/or ash components composed of burnt additives. These components can be deposited on the electrode structure of the soot sensor 10 and falsify the current/soot characteristic curve of the soot sensor over the course of time. There is therefore a need for continuous evaluation of the state of the soot sensor 10 in the motor vehicle 15.

The direction of flow of the exhaust gas stream 6 is indicated by the arrow. The object of the soot sensor 10 is now to measure the concentration of the soot particles 4 in the exhaust gas stream 6. For this purpose, the soot sensor 10 is arranged in the exhaust pipe 5 such that the structure composed of measuring electrodes 3 faces the exhaust gas stream 6 and therefore the soot particles 4. Soot particles 4 from the exhaust gas stream 6 are deposited both on the measuring electrodes 3 and in the intermediate spaces between the measuring electrodes 3, on the insulating regions of the shaped element 1. If sufficient soot particles 4 are deposited on the insulating regions between the measuring electrodes 3, a direct current will flow between the measuring electrodes 3 owing to the conductivity of the soot particles 4, and the said direct current can be measured by the current-measuring element 7. The soot particles therefore bypass the electrically insulating intermediate spaces between the measuring electrodes 3. In this way, it is possible to measure the loading of the exhaust gas stream 6 with soot particles 4 using the soot sensor 10 which is illustrated here.

In addition, the soot sensor 10 in FIG. 2 shows the heating element 2 which can be supplied with electrical current from the heating current supply 8 by the heating circuit 13. In order to heat the soot sensor 10 to the burn-off temperature of the soot particles 4, the heating current switch 9 is repeatedly closed and opened, as a result of which the heating element 2 heats up and therefore the entire soot sensor 10 is heated. This pulsed current is generated at the times $t_1$ to $t_n$. For this purpose, the heating current switch is advantageously embodied as an electronic switch.

Furthermore, a temperature sensor 11 is preferably integrated into the soot sensor 10 and monitors the process of the heating of the soot sensor 10 and therefore the burn-off process of the soot particles 4 using the temperature evaluation electronics 12. The electrical heating element 2 can be embodied such that it can be used at the same time as a temperature sensor 11.

The current-measuring element 7, the temperature evaluation electronics 12 and the heating current switch 9 are illustrated here by way of example as discrete components, and of course these components may be part of a micro-electronic circuit which is integrated, for example, into a control unit for the soot sensor 10. Furthermore, a voltage-measuring device 17 can be seen which can also be part of the micro-electronic circuit.

The electrical conductivity K cannot be measured directly but is usually determined by measurements from current I, the dropping voltage U and the sample geometry in a way which is analogous to the specific resistance. Depending on the sample geometry, it is possible to use various methods: the standard method for measuring a large-area homogenous layer is a four-point measurement, especially applied in the semiconductor industry. If the layer is small and has a random shape, the conductivity can be determined with a Van-der-Pauw measuring method. For a long conductor of known cross-section A, the conductivity can be determined by four-conductor measurement and the formula:

$$K = (I*l)/(U*A)$$

K is the electrical conductance, I is the current passing through the conductor, U is the drop in voltage in the conductor, A is the cross section of the conductor and l is the distance between the two measuring contacts.

The electrical conductivity K is defined as the proportionality constant between the current density $\vec{j}$ and the electrical field strength $\vec{E}$ in the general form of the ohmic law:

$$\vec{j} = K * \vec{E}$$

The electrical conductivity K is the reciprocal value of the specific resistance.

Figure 3:
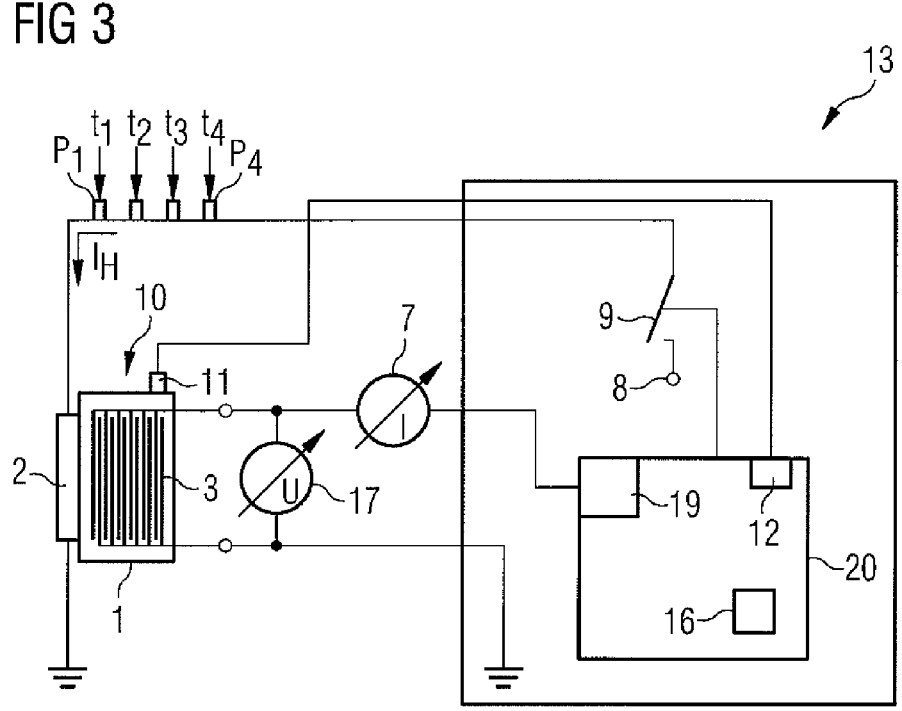
FIG. 3 Is an evaluation circuit, permanently installed in a motor vehicle, for on-board evaluation of the state of the soot sensor in the vehicle.

FIG. 3 is a schematic representation of the evaluation circuit 13, permanently installed in a motor vehicle 15, for on-board evaluation of the state of the soot sensor 10 in a vehicle. The soot sensor 10 has a measuring electrode structure in which the electrodes 3 engage one another in the other in the manner of fingers, which structure does not have any metallic short-circuits whatsoever when a soot sensor 10 is intact. Soot particles 4 are deposited on and between the measuring electrodes 3 during the measuring operation of the sensor and give rise to a flow of current between the measuring electrodes 3 which serves as a measure for the loading of soot in the exhaust gas stream. However, a maximum conductivity through the soot layer is reached starting from a specific quantity of deposited soot particles 4 on the measuring electrodes 3. This maximum conductivity cannot be increased further, even when further deposition of soot occurs. For this reason, starting from a specific quantity of deposited soot particles the soot sensor 10 is "blind" to further measurement of the soot concentration in the exhaust gas. It is then necessary to regenerate the soot sensor 10 by burning off the soot layer on the measuring electrodes 3. For this purpose, a pulsed heating current is conducted from the heating current supply 8 to the heating element 2 by switching the heating current switch 9.

The soot sensor 10 is heated in a controlled fashion. The control of the heating of the soot sensor 10 is carried out with the temperature sensor 11 which is embodied on or in the soot sensor 10. The dependence of the soot sensor resistance or the conductivity K thereof on the temperature at the soot sensor 10 can be recorded by the evaluation circuit 13. This forms the function of the electrical conductivity K of the real soot sensor 10 on its temperature. The function of the resistance of a completely intact soot sensor 10 on its temperature can be stored in the electronic memory 16. These functions describe the temperature coefficients of the real soot sensor 10 and of the completely intact soot sensor 10. The significantly different temperature coefficients of the intact and defective soot sensors result, for example, from the fact that carbon and therefore soot is a typical hot conductor and metallic conductors are typical cold conductors. The function of the electrical conductivity K of the soot sensor 10 in its temperature and therefore its temperature coefficient will depend essentially on whether a metallic conduction process or the carbon/soot line dominates. It is then possible to compare the measured temperature coefficient with that of the intact soot sensor 10 and to detect a defective soot sensor 10 on the basis of this comparison. Furthermore, the ashing (depositing of ash on the measuring electrodes) and soot cross-sensitivity play a decisive role in the state of the soot sensor 10.

In the evaluation circuit 13, there is, on the microcontroller 20, the electronic memory 16 in which the electrical conductivity K of a fault-free soot sensor 10 is stored as a function of the soot sensor temperature T. The measured electrical conductivity K of the soot sensor 10 can then be compared with the conductivity/temperature function of a fault-free soot sensor 10 which is stored in the electronic memory 16. It is therefore possible to evaluate the state of the soot sensor 10. If a fault is detected in the state of the soot sensor 10, a corresponding fault signal can be transmitted to an engine management system in the motor vehicle, after which the driver of the motor vehicle is requested to exchange the soot sensor 10 and the fault is stored in the on-board diagnostic unit 22 of the motor vehicle.

Figure 4:
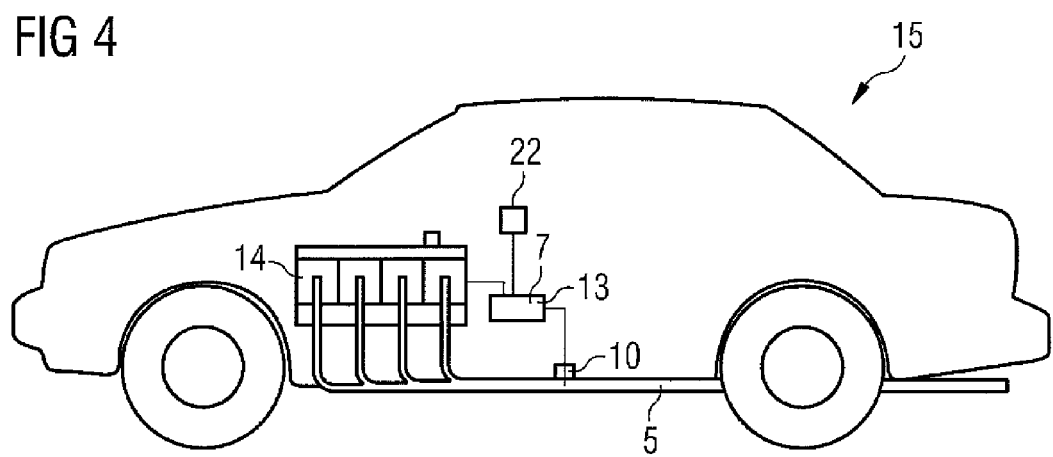
FIG. 4 is a motor vehicle with an internal combustion engine.

For the purpose of generally illustrating the entire system, FIG. 4 shows a motor vehicle 15 with an internal combustion engine 14. The internal combustion engine 14 conducts away, via an exhaust pipe 5, the exhaust gas stream 6 generated by the internal combustion engine 14. A soot sensor 10, which is connected to an evaluation circuit 13 which can also contain the current-measuring element 7, is arranged in the exhaust pipe 5. The evaluation circuit 13, which is described in detail with respect to FIG. 3, passes on the signals relating to the defectiveness of the soot sensor 10 and/or the detected information relating to further components in the soot to the on-board diagnostic unit 22. Both the current-measuring element 7 and the voltage-measuring element 17 for measuring the electrical conductance of the exhaust gas stream 6, and the evaluation circuit 13 for performing on-board functional diagnostics of a soot sensor 10 in a motor vehicle 15, can be embodied on one and the same integrated electronic circuit.

Figure 5:
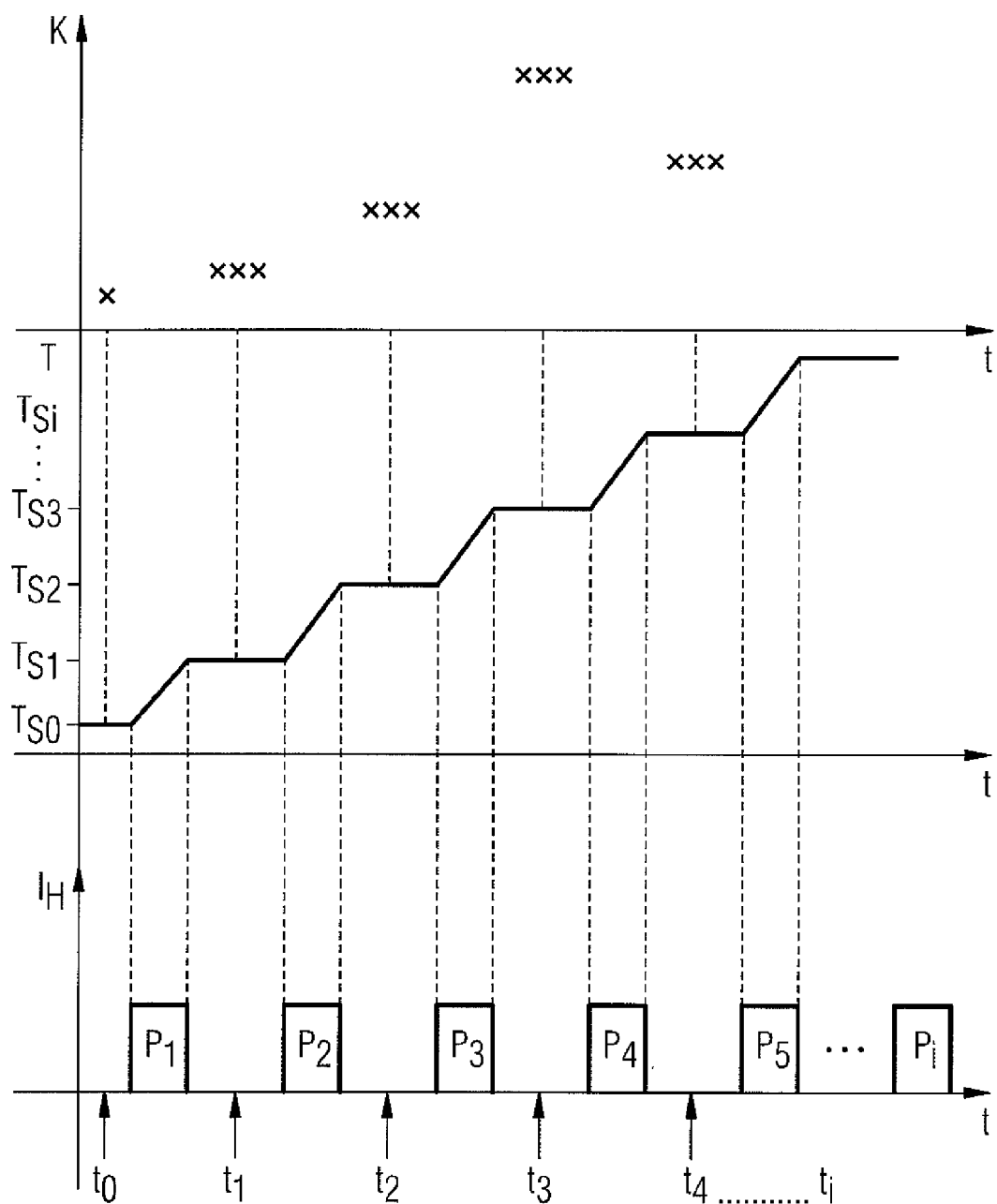
FIG. 5 is a schematic illustration of the method.

FIG. 5 illustrates the method for evaluating the state of the soot sensor 10 in more detail on the basis of diagrams. Here, the soot sensor 10 is heated with heating current pulses $P_1, P_2, P_3, P_4, P_5, \ldots, P_i$ (i stands for any natural number). The heating current is denoted by $I_H$ in the diagram, and the heating current pulses $P_1$ to $P_5$ are arranged on the time axis t. Before the first heating current pulse $P_1$ is transmitted to the heating element, there is a time $t_0$ at which the soot sensor 10 is in thermal equilibrium with the exhaust gas stream 6 in the exhaust pipe 5. The soot sensor 10 is heated to the temperature $T_{S1}$, which is slightly above the temperature in the thermal equilibrium $T_{S0}$, using the first heating current pulse $P_1$. During this heating process with the heating current pulse $P_1$, the conductivity K between at least two measuring electrodes 3 is not determined. After the first heating current pulse $P_1$ has been switched off, the measurement of the electrical conductivity K between the measuring electrodes 3 begins.

The soot sensor 10 is located between the first heating current pulse $P_1$ and the second heating current pulse $P_2$, at a virtually constant temperature $T_{S1}$. A thermal equilibrium therefore occurs in the soot sensor 10, and electro-dynamic influences from the heating current pulses $P_1$ and $P_2$ (and also from all other heating current pulses $P_i$) are avoided. The complexity of the tensor of the electrical conductivity K is therefore minimized, and in the best case the conductivity sensor is reduced to a scalar.

A plurality of conductivity measurements can be carried out between the heating current pulses $P_1$ and $P_2$, and this is illustrated by the three measuring points above the value $P_1$ in the diagram of the conductivity (top diagram). The next heating current pulse $P_2$ is then applied and the soot sensor 10 heats up from the temperature $T_{S1}$ to the temperature $T_{S2}$. While the second heating current pulse $t_2$ is applied, no conductivity measurement at all is performed. After the second heating current pulse $P_2$ has been switched off, there is again a time period for the measurement of the conductivity K between the measuring electrodes 3. These measurements can be carried out until the third heating current pulse $P_3$ is switched on. The soot sensor 10 is also in thermal equilibrium at the temperature $T_{S2}$ in the region around the time $t_2$, and electro-dynamic influences from the heating current are not present. A plurality of measurements for the electrical conductivity K can in turn be carried out in the time period between the second and third heating current pulses $P_3$.

The soot sensor 5 is successively heated to the burn-off temperature $T_{Si}$ of the soot with the third, fourth, fifth and i-th heating current pulses $P_3$, $P_4$, $P_5$, $P_i$. Conductivity measurements take place exclusively at times $t_1, t_2, t_3, t_4, \ldots t_i$ between the heating current pulses $P_1, P_2, P_3, P_4, \ldots, P_i$. The temperature T of the soot sensor 10 is therefore virtually constant during the detection of the electrical conductivity K. All of the negative influences for the conductivity measurements which result from the increase in temperature are excluded here. The method proposed here therefore permits a highly precise assessment of the state of a soot sensor in a motor vehicle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for evaluating a state of a soot sensor having at least two measuring electrodes that are electrically connected to an evaluation circuit which is permanently installed in a motor vehicle having an internal combustion engine, comprising:
    detecting a loading of an exhaust gas stream of the internal combustion engine with soot particles by the soot sensor;
    detecting and evaluating by the evaluation circuit a conductivity between the at least two measuring electrodes of the soot sensor;
    applying heating current pulses to a soot sensor heater to indirectly heat the measuring electrodes of the soot sensor to a plurality of increasing stepped temperatures, each stepped temperature below a soot burn off temperature;
    measuring the conductivity between the at least two measuring electrodes at times between the heating current pulses, wherein the stepped temperature of the soot sensor is substantially constant during the measuring of the electrical conductivity; and
    increasing the temperature of the soot sensor to the soot burn off temperature.

2. The method for evaluating a state of a soot sensor according to claim 1,
    wherein the measuring of the conductivity between the measuring electrodes is detected exclusively at times between the heating current pulses.

3. The method for evaluating a state of a soot sensor according to claim 2,
    wherein the temperature of the soot sensor increases with the application of each heating current pulse.

4. The method for evaluating a state of a soot sensor according to claim 3,
    wherein a plurality of measurements of conductivity are performed between the heating current pulses.

5. The method for evaluating a state of a soot sensor according to claim 1, wherein the soot sensor is at thermal equilibrium with the exhaust stream before the heating of the measuring electrodes of the soot sensor.

6. The method for evaluating a state of a soot sensor according to claim 1, wherein the soot sensor heater heats the measuring electrodes from thermal equilibrium with the exhaust stream to the soot burn off temperature in a plurality of steps.

7. A soot sensor assembly comprising:
    a soot sensor comprising:
        a substrate;
        at least one pair of measuring electrodes arranged on a first side of the substrate configured to be exposed to an exhaust stream of an internal combustion engine; and
        a heating element arranged on a second side of the substrate opposite the first side;
    a heating circuit that supplies the heating element with pulsed electrical current generated at discrete time intervals to heat the heating element to a plurality of increasing stepped temperatures to a soot burn off temperature; and
    evaluation electronics that measures a conductivity between the at least one pair of measuring electrodes at times between the heating current pulses, wherein a temperature of the soot sensor is substantially constant during the measuring of the electrical conductivity.

8. The soot sensor assembly of claim 7, wherein the at least one pair of measuring electrodes is configured as a comb-like structure.

9. The soot sensor assembly of claim 7, wherein the substrate is ceramic.

10. The soot sensor assembly of claim 7, further comprising a temperature sensor configured to measure a temperature of the soot sensor.

* * * * *